United States Patent
Chang et al.

(10) Patent No.: US 9,002,821 B2
(45) Date of Patent: Apr. 7, 2015

(54) INDEXING APPLICATION PAGES OF NATIVE APPLICATIONS

(71) Applicant: Google Inc., Mountain View, CA (US)

(72) Inventors: Lawrence Chang, Foster City, CA (US); Chaesang Jung, Palo Alto, CA (US); Jaehyun Yeom, Mountain View, CA (US); Sang-il Lee, Seongdong-gu (KR)

(73) Assignee: Google Inc., Mountain View, CA (US)

( * ) Notice: Subject to any disclaimer, the term of this patent is extended or adjusted under 35 U.S.C. 154(b) by 295 days.

(21) Appl. No.: 13/742,771

(22) Filed: Jan. 16, 2013

(65) Prior Publication Data

US 2014/0201179 A1  Jul. 17, 2014

(51) Int. Cl.
G06F 17/30  (2006.01)

(52) U.S. Cl.
CPC ................. *G06F 17/30864* (2013.01)

(58) Field of Classification Search
USPC .................................................. 707/706–711
See application file for complete search history.

(56) References Cited

U.S. PATENT DOCUMENTS

| | | | |
|---|---|---|---|
| 7,617,225 B2 | 11/2009 | Arrouye | |
| 8,086,957 B2 | 12/2011 | Bauchot | |
| 8,458,384 B2 | 6/2013 | Johnson | |
| 8,510,648 B2 * | 8/2013 | Harman et al. | 715/255 |
| 8,510,764 B1 | 8/2013 | Deselaers | |
| 8,515,979 B2 | 8/2013 | Mehta | |
| 8,554,345 B2 | 10/2013 | Fernandez | |
| 8,595,450 B2 | 11/2013 | Nguyen | |
| 8,745,108 B2 * | 6/2014 | Jansson | 708/170 |
| 2004/0030882 A1 | 2/2004 | Forman | |
| 2005/0177562 A1 | 8/2005 | Raciborski | |
| 2007/0209080 A1 | 9/2007 | Ture | |
| 2009/0150363 A1 | 6/2009 | Gross et al. | |

(Continued)

FOREIGN PATENT DOCUMENTS

| | | |
|---|---|---|
| EP | 2474905 A2 | 7/2012 |
| EP | 2495670 A1 | 9/2012 |

OTHER PUBLICATIONS

"Adding deep linking to Google+ posts shared from your iOS app," [online][Retrieved on Jan. 7, 2014]; Retrieved from the Internet URL: https://developers.google.com/+/mobile/ios/share/deep-link; 3 pages.

(Continued)

*Primary Examiner* — Debbie Le
(74) *Attorney, Agent, or Firm* — Fish & Richardson P.C.

(57) ABSTRACT

Methods, systems, and apparatus, including computer programs encoded on a computer storage medium, for indexing application pages of native applications that operate independent of a browser application on a user device. In one aspect, a method includes instantiating a virtual machine emulating an operating system of a user device; instantiating, within the virtual machine, a native application that generates application pages for display on a user device within the native application; accessing, within the virtual machine, application pages of the native application, and for each of the application pages: generating application page data describing content of the application page, the content described by the application page data including text that a user device displays on the application page when the user device displays the application page; and indexing the application page data for the native application in an index that is searchable by a search engine.

28 Claims, 6 Drawing Sheets

(56) References Cited

U.S. PATENT DOCUMENTS

| | | | |
|---|---|---|---|
| 2010/0082661 | A1 | 4/2010 | Beaudreau |
| 2010/0257466 | A1 | 10/2010 | Wroblewski |
| 2010/0306191 | A1 | 12/2010 | LeBeau |
| 2011/0252038 | A1 | 10/2011 | Schmidt |
| 2011/0307463 | A1 | 12/2011 | Kasterstein et al. |
| 2011/0314004 | A1 | 12/2011 | Mehta |
| 2012/0124061 | A1 | 5/2012 | Macbeth |
| 2012/0179706 | A1 | 7/2012 | Hobbs |
| 2012/0179955 | A1 | 7/2012 | French |
| 2012/0254776 | A1 | 10/2012 | Corella et al. |
| 2012/0290584 | A1 | 11/2012 | De Bona et al. |
| 2012/0316955 | A1 | 12/2012 | Panguluri |
| 2012/0323898 | A1 | 12/2012 | Kumar |
| 2013/0006897 | A1 | 1/2013 | Jain |
| 2013/0047149 | A1* | 2/2013 | Xu et al. ............ 717/175 |
| 2013/0110815 | A1 | 5/2013 | Tankovich |
| 2013/0111328 | A1 | 5/2013 | Khanna |
| 2013/0122861 | A1 | 5/2013 | Kim |
| 2013/0124606 | A1 | 5/2013 | Carpenter |
| 2013/0191360 | A1 | 7/2013 | Burkard |
| 2013/0232256 | A1 | 9/2013 | Lee |
| 2013/0298007 | A1 | 11/2013 | Cullen |
| 2013/0325856 | A1 | 12/2013 | Soto |
| 2014/0019958 | A1* | 1/2014 | Sherman ............ 717/178 |
| 2014/0108913 | A1* | 4/2014 | Bourke et al. ......... 715/234 |

OTHER PUBLICATIONS

"App Linking," [online][Retrieved on Jan. 7, 2014]; Retrieved from the Internet URL: https:/ldevelopers.facebook.com/docs/android/link-to-your-native-app/; 14 pages.

"Class Gecko View Content," [online][Retrieved on Jan. 2, 2014]; Retrieved from the Internet URL: people.mozilla.org/~mfinkle/geckoview/docs/org/Mozilla/gecko/GeckoViewContent.html; 4 pages.

"Frequently Asked Questions—General Information," [online][Retrieved on Jan. 7, 2014]; Retrieved from the Internet URL: https://linksmanager.com/Frequently+Asked+Questions+-+General+Information; 8 pages.

"How to determine when an application is fully launched?" [online][Retrieved on Jan. 2, 2014]; Retrieved from the Internet URL: social.msdn.microsoft.com/Forums/en-US/27e7353-eb4b-4e23-bf56-84f3efbbecba/how-to-determine-when-an-application-is-fully-launched; 5 pages.

"NSApplication Class Reference," [online][Retrieved on Jan. 2, 2014]; Retrieved from the Internet URL: https://developer.apple.com/library/mac/documentation/cocoa/reference/applicationkit/classes/NSApplication_Class/Reference/Reference.html; 66 pages.

"Seven Tips for Supercharging Your Links," [online][Retrieved on Jan. 7, 2014]; Retrieved from the Internet URL: goarticles.com/article/Seven-Tips-For-Supercharging-Your-Links/3056299/; 5 pages.

"Sharing to Google+ from your Android app," [online][Retrieved on Jan. 7, 2014]; Retrieved from the Internet URL: https://developers.google.com/+/mobile/android/share/#handling_incoming_deep_links; 2 pages.

International Search Report and Written Opinion in International Application No. PCT/US2014/011256, mailed Apr. 15, 2014, 12 pages.

Google Play Store [online]. [retrieved on Mar. 11, 2013]. Retrieved from the Internet: <URL: https://play.google.com/store>, 3 pages.

"Visability for Your Apps/Android Developers" Developer.Andriod.com [online]. [retrieved on Mar. 11, 2013]. Retrieved from the Internet: <URL: http://developer.android.com/distribute/googleplay/about/visibility.html>, 6 pages.

Klais, "5 SEO Tips to Get Mobile Apps Ranked in SERPs," Search Engine Land [online], Dec. 19, 2011 [retrieved on Mar. 11, 2013]. Retrieved from the Internet: <URL: http://searchengineland.com/5-seo-tips-to-get-mobile-apps-ranked-in-serps-104595>, 6 pages.

"Deeplink.me Lets Mobile Users Navigate Through a "Web" of Apps," [online][Retrieved on Dec. 13, 2013]; Retrieved from the Internet URL: techcrunch.com/2013/05/22new-service-called-deeplink-me-will-let-mobile-users-navigate-through-a-web-of-apps/; 8 pages.

"Google's Search Results Can Deep-Link to Your Android Apps," [online] [Retrieved on Dec. 13, 2013]; Retrieved from the Internet URL: techcrunch.com/2013/10/31/android-4-4-kitkat-app-indexing/; 6 pages.

"How to get a deep link of my application from the Windows Phone Marketplace using .NET code?," [online] [Retrieved on Dec. 13, 2013]; Retrieved from the Internet URL: stackoverflow.com/questions/13639564/how-to-get-a-deep-link-of-my-application-from-the-windows-phone-marketplace-usin; 2 pages.

"Indexing apps just like websites," [online] [Retrieved on Dec. 13, 2013]; Retrieved from the Internet URL: googlewebmastercentral.blogspot.com/2013/10/indexing-apps-just-like-websites.html; 4 pages.

"Instant Pages on Google Chrome," [online] [Retrieved on Dec. 16, 2013]; Retrieved from the Internet URL: chrome.blogspot.jp/2011/instant-pages-on-google-chrome.html; 3 pages.

"Mobile deep linking," [online] [Retrieved on Dec. 13, 2013]; Retrieved from the Internet URL: en.wikipedia.org/wiki/Mobile_deep_linking; 2 pages.

"Ready for a "Web" of Apps? Quixey Launches AppURL, A New Way to Enable Deep Linking Across Mobile Applications," [online] [Retrieved on Dec. 13, 2013]; Retrieved from the Internet URL: techcrunch.com/2013/08/02/ready-for-a-web-of-apps-quixey-launches-appurl-a-new-way-to-enable-deep-linking-across-mobile-applications/; 8 pages.

* cited by examiner

Widget : Contact Info Widget

ListView : Friends

Group1
            TextView : Name1
            TextView : Tel1
            TextView : Email1

Group2
            TextView : Name2
            TextView : Tel2
            TextView : Email2

Group3
            TextView : Name3
            TextView : Tel3
            TextView : Email3

INDEXING APPLICATION PAGES OF NATIVE APPLICATIONS

BACKGROUND

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide structured information, such as on-line encyclopedias, movie databases, etc.

A variety of search engines are available for identifying particular resources accessible over the Internet. These search engines crawl and index the various web page resources. The search engine then uses the index to determine which resources are most responsive to a search query and provides search results that link to the resources in response to the query.

With the advent of tablet computers and smart phones, native applications that facilitate the performance of the same functions facilitated by the use of web page resources are now being provided in large numbers. Search engines, however, do not crawl or index information from within a native application environment. Instead, metadata regarding the native application are indexed and then accessed when processing search queries.

SUMMARY

This specification describes technologies relating indexing application pages of native applications.

In general, one innovative aspect of the subject matter described in this specification can be embodied in methods that include the actions instantiating a virtual machine emulating an operating system of a user device; instantiating, within the virtual machine, a native application that generates application pages for display on a user device within the native application, the native application operating independent of a browser application that can operate on the user device; accessing, within the virtual machine, application pages of the native application, and for each of the application pages: generating application page data describing content of the application page, the content described by the application page data including text that a user device displays on the application page when the user device displays the application page, and indexing the application page data for the native application in an index that is searchable by a search engine. Other embodiments of this aspect include corresponding systems, apparatus, and computer programs, configured to perform the actions of the methods, encoded on computer storage devices.

Another innovative aspect of the subject matter described in this specification can be embodied in methods that include the actions receiving first search results responsive to a search query, each of the search results referencing a resource that can be rendered in a browser application on a user device and including a link to the resource, the first search results generated in response to a search of a first index of resources that can be rendered in the browser application; receiving at least one second search result responsive to the query, the second search result specifying a native application operating independent of a browser application that can operate on the user device, the second search result generated in response to a search of a second index of application pages that can be display on a user device within the native application; and providing the first search results and the second search result for display on a user device. Other embodiments of this aspect include corresponding systems, apparatus, and computer programs, configured to perform the actions of the methods, encoded on computer storage devices.

Another innovative aspect of the subject matter described in this specification can be embodied in methods that include the actions of instantiating, within an operating system environment, a native application that generates application pages for display on a user device within the native application, the native application operating independent of a browser application that can operate on the user device; accessing, within the operating system environment, application pages of the native application, and for each of the application pages: extracting application page data describing content of the application page, the application page data being data provided to a rendering process of the native application, wherein the rendering process receives the application page data and renders the content of the application page based on the application page data, and associating the application page data with an application page identifier of the application page and a native application identifier of the native application. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The information stored in the application page index of native application pages is taken from actual application page data, and may thus provide a more comprehensive description of application content than is provided by metadata that is external to the native application and that describes the native application. This, in turn, may provide a search engine with the ability to determine relevance measures that are more accurate than relevance measures based on the metadata describing the native application. In particular, the application page index of native application pages provides a search engine with the capability of surfacing search results for native applications that take into account the actual data provided within the application pages of the native application. This is potentially more accurate than relying solely on metadata that is descriptive of a native application, such as a title and description of the native application, and also relieves the publishers of performing search engine optimizations on the metadata to ensure that the native applications are identified in response to particular queries.

Implementations in which application page data are accessed in binary form reduce the likelihood of descriptive errors that may result when using techniques that derive such data, such as optical character recognition errors. Furthermore, accessing the data in binary form also identifies data that would otherwise be hidden from a viewport, such as in the case in which a scrollable element must be actuated to move the viewport within an application environment. That collection of application page data uses the native application as a source of the application page data, and thus collection of data describing the application can be accomplished in a more timely manner than by collecting metadata from multiple different websites. Likewise, the collection of application page data in this manner is more scalable than collecting metadata from multiple different websites.

The details of one or more embodiments of the subject matter described in this specification are set forth in the accompanying drawings and the description below. Other

BRIEF DESCRIPTION OF THE DRAWINGS

Like reference numbers and designations in the various drawings indicate like elements.

DETAILED DESCRIPTION

A system crawls and indexes application pages of native applications. As used herein, a native application generates application pages for display on a user device within an environment of the native application, and operates independent of a browser application on the user device. A native application is an application specifically designed to run on a particular user device operating system and machine firmware. Native applications thus differ from browser-based applications and browser-rendered resources. The latter require all, or at least some, elements or instructions downloaded from a web server each time they instantiated or rendered. Furthermore, browser-based applications and browser-rendered resources can be processed by all web-capable mobile devices within the browser and thus are not operating system specific.

To index data for a native application, the system instantiates a virtual machine that emulates an operating system operating on a user device. Within the virtual machine, the system instantiates a native application specific to the operation system. The native application generates application pages for display on a user device within the native application, and operates independent of a browser application on a user device.

The system accesses, within the virtual machine, application pages of the native application. The system can access the pages by an automated process that explores various menus and selection options for each application page and each subsequent application page. Alternatively, the system can access the pages that are specified by a publisher of the native application.

For each of the application pages, the system generates application page data describing content of the application page. The content described by the application page data may, for example, include: text that a user device displays on the application page when the user device displays the application page; image data that defines an image of the application page as would be rendered in the native application; listing/menu data that describes various lists and menus of the application page; and other data that describes other features of the application page.

The application pages for the native application are then indexed in an index that is searchable by a search engine. The search engine can combine web resource search results that reference web resources that can be rendered in a browser application on a user device, and native application search results that specify the native application. The native application search results are generated, in part, in response to a search of index of the application pages for native applications.

Operation of the system that indexes application page data and the processing of search results for application pages is described in more detail below.

Figure 1:
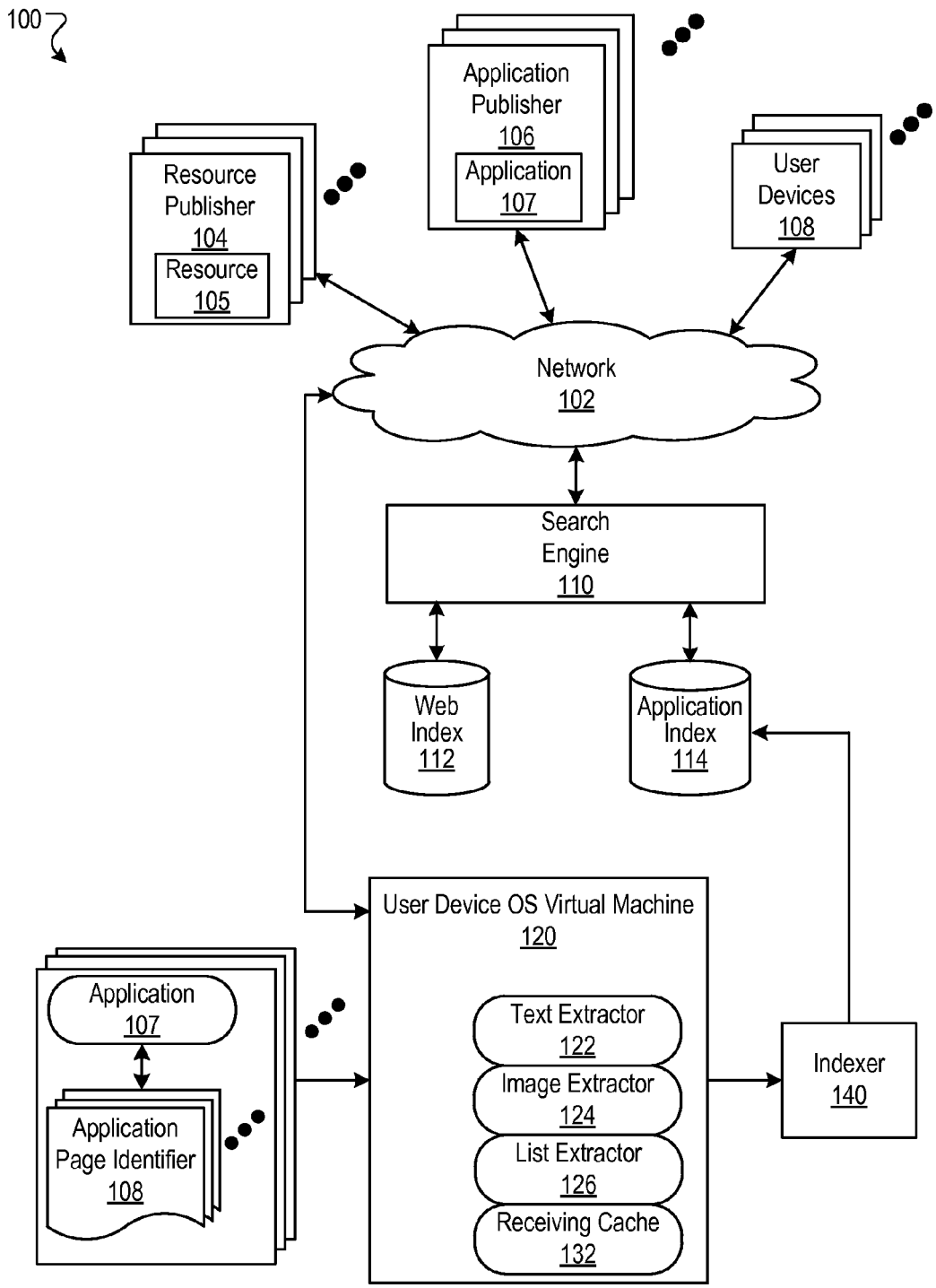
FIG. 1 is a block diagram of an example environment in which application pages for native applications are indexed and searched.

FIG. 1 is a block diagram of an example environment 100 in which application pages for native applications are indexed and searched. A computer network 102, such as the Internet, connects resource publisher web sites 104, application publishers 106, user devices 108 and a search engine 110.

A resource publisher website 104 includes one or more web resources 105 associated with a domain and hosted by one or more servers in one or more locations. Generally, a resource publisher website is a collection of web pages formatted in hypertext markup language (HTML) that can contain text, images, multimedia content, and programming elements. Each website 104 is maintained by a content publisher, which is an entity that controls, manages and/or owns the website 104.

A web page resource is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts.

An application publisher website 106 may also include one or more web resources 105, and also provides native applications 107. As described above, a native application 107 is an application specifically designed to run on a particular user device operating system and machine firmware. As used in this specification, an "application page" is a particular display environment within a native application and in which is displayed content, such as text, images, and the like. An application page is specific to the particular native application, and the native application is specific to the particular operating system of the user device 108. An application page differs from a rendered web resource in that the application page is generated within and specific to the native application, while a web resource may be rendered in any browser for which the web page resource is compatible, and is independent of the operating system of the user device.

A user device 108 is an electronic device that is under the control of a user. A user device 108 is typically capable of requesting and receiving web page resources 104 and native applications 107 over the network 102. Example user devices 108 include personal computers, mobile communication devices, and tablet computers.

To search web resources 105 and the native applications 107, the search engine 110 accesses a web index 112 and an application index 114. The web index 112 is an index of web resources 105 that has, for example, been built from crawling the publisher web sites 104. The application index 114 is an index of application pages for native applications 107, and is constructed using a virtual machine 120 and an indexing process that is described in more detail below. Although shown as separate indexes, the web index 112 and the application index 114 can be combined in a single index.

The user devices 108 submit search queries to the search engine 110. In response to each query, the search engine 110 accesses the web index 112 and the application index 114 to identify resources and applications, respectively, that are relevant to the query. The search engine 110 may, for example, identify the resources and applications in the form of web resource search results and native application search results, respectively. Once generated, the search results are provided to the user device 108 from which the query was received.

A web resource search result is data generated by the search engine 110 that identifies a web resource and provides information that satisfies a particular search query. A web resource search result for a resource can include a web page title, a snippet of text extracted from the resource, and a resource locator for the resource, e.g., the URL of a web page. A native application search result specifies a native application and is generated in response to a search of the application index 114 of application pages. A variety of functions can be invoked by the selection of an application search result. For example, selection of a native application search result may cause the native application to launch (if installed on the user device 108) and generate an instance of application page referenced in the application search result and that includes content that is relevant to the search query. Such a function is referred to as "deep linking" within the application search result.

Figure 2:
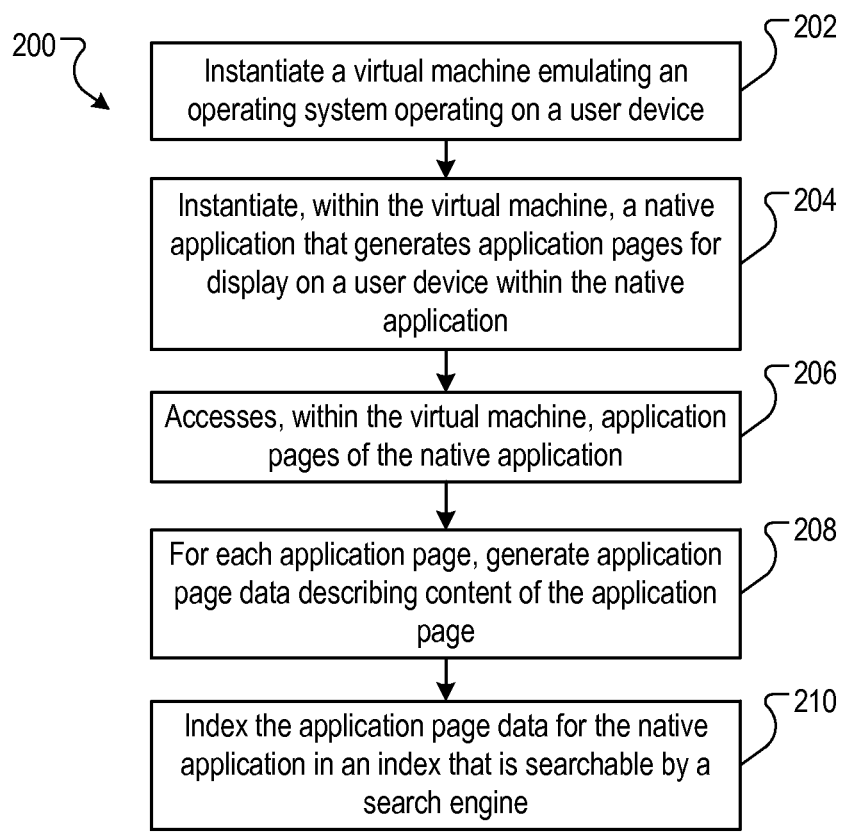
FIG. 2 is a flow diagram of an example process for indexing application page data of native applications.

The collection of application page data for the application index is described with reference to FIG. 1 and with further reference to FIG. 2, which is a flow diagram of an example process 200 for indexing application page data of native applications. The process 200 can be implemented in a data processing apparatus of one or more computers in data communication.

The process 200 instantiates a virtual machine 120 emulating an operating system for a user device (202). The virtual machine 120 may, in some implementations, be a modified version of the operating system and includes extractors that extract data from application pages as described in more detail below.

The process 200 instantiates, within the virtual machine 120, a native application 107 that generates application pages for display on a user device within the native application 107. For example, the virtual machine 120 may, for each application in a set of native applications 107 to be processed, launch an instance of the native application 107.

The process 200 accesses, within the virtual machine 120, application pages of the native application (206). In some implementations, the virtual machine accesses the pages by an automated process that explores various menus and selection options for each application page and each subsequent application page. Such an automated process can be accomplished by sequentially selecting menu options and links according to a deterministic routine that results in the selection of each application page provided by the native application 107. Alternatively, the virtual machine 120 can access the application pages that are specified by a publisher of the native application. For example, and application publisher may provide a list of application page identifiers 108 in the form of uniform resource identifiers (URIs) that the publisher desires to be crawled and indexed in the application index 114, and only those application pages referenced by the URIs for the particular native application 107 are accessed and indexed.

For each application page, the process 200 generates application page data describing content of the application page (208). The content of the page may include, for example, text displayed on the application page; images displayed on the application page; links on the application page to other application pages or other web resources; and other content that is appropriate for indexing.

In some implementations, the virtual machine 120 includes extractors that extract content data for indexing. The extracted content data is, for example, data that is provided to a rendering process of the native application. The rendering process renders content based on the data for display on a user device. Use of extractors allows for more accurate identification of the various content of an application page. For example, the text extractor 122 extracts text data provided to a rendering process of the native application. The text data specifies the text that is to be rendered in the application page. Thus, rather than processing an image of the application page, or processing binary data of the display, the virtual machine 120 receives the actual text that is to be rendered in the environment of the native application 107.

Other extractors can likewise be used, such as an image extractor 124 and a list extractor 126. The image extractor 124 provides image data of an image that is to be rendered in the environment of the native application 107, and the list extractor 126 provides list data of a list of scrollable items that is rendered in the environment of the native application 107. Other data can also be extracted, such as application page link data describing links within the application page that link to another application page; web page link data describing links within the application page that link to a web resource referenced by a uniform resource locator and that, when selected, instantiate a browser application that renders the resource in a browser environment separate from the native application; etc.

The extractors 122, 124 and 126, and other appropriate data extractors, can be implemented using appropriate data handlers for a particular operating system. For example, for the Android™ operating system, the extractors 122, 124 and 126 may be implemented using TextView objects, ImageView objects, and ListView objects, respectively. The virtual machine 120 processes the objects to extract the corresponding data, e.g., by including instructions that cause the virtual machine to store for indexing the corresponding data that is provided for rendering. A more detailed description of the extraction of application page data is described with reference to FIGS. 5 and 6A-6C below.

The process 200 indexes the application page data for the native application in an index that is searchable by the search engine (210). For example, an indexer 140 indexes, for each application page URI and native application 107 identifier, the application page data describing the content for the application page. The indexed data are stored in the application index 114. A variety of appropriate indexing processes can be used to index the data. For example, the application index 114 can include, for each native application 107 and URI pair, a row of data describing the application page data. The particular database and indexing scheme used may, for example, depend on the search engine algorithms utilized within the search engine.

In some situations, a particular native application page may have different URIs that correspond to different content. For example, a stock quote application may have a first portion of a URI that is the same for all stock quotes, and a second portion of the URI, such as a query parameter, that includes a name-value pair for a specific quote or quotes to be displayed on the application page. In some implementations, each specific instance of a unique URI constitutes an entry in the application index 114. In variations of this implementation, not all possible URI's are processed. Instead, the URI's that are indexed may be for the N most popular query values that are provided from users, e.g., the top 100 most requested stocks, the top 100 most requested movies, etc.

Some native applications may request data and/or instructions from a source that is external to the virtual machine 120. Examples of such sources are web servers, feed sources, etc. The requested data and/or instructions may also be indexed in the application index 114. Accordingly, in some implementations, the virtual machine 120 may include a receiving cache 132 that stores data and instructions that are requested by the native application 107. The virtual machine 120 is configured to intercept the received data and store a copy of the data in the receiving cache 132 for indexing.

Figure 3:
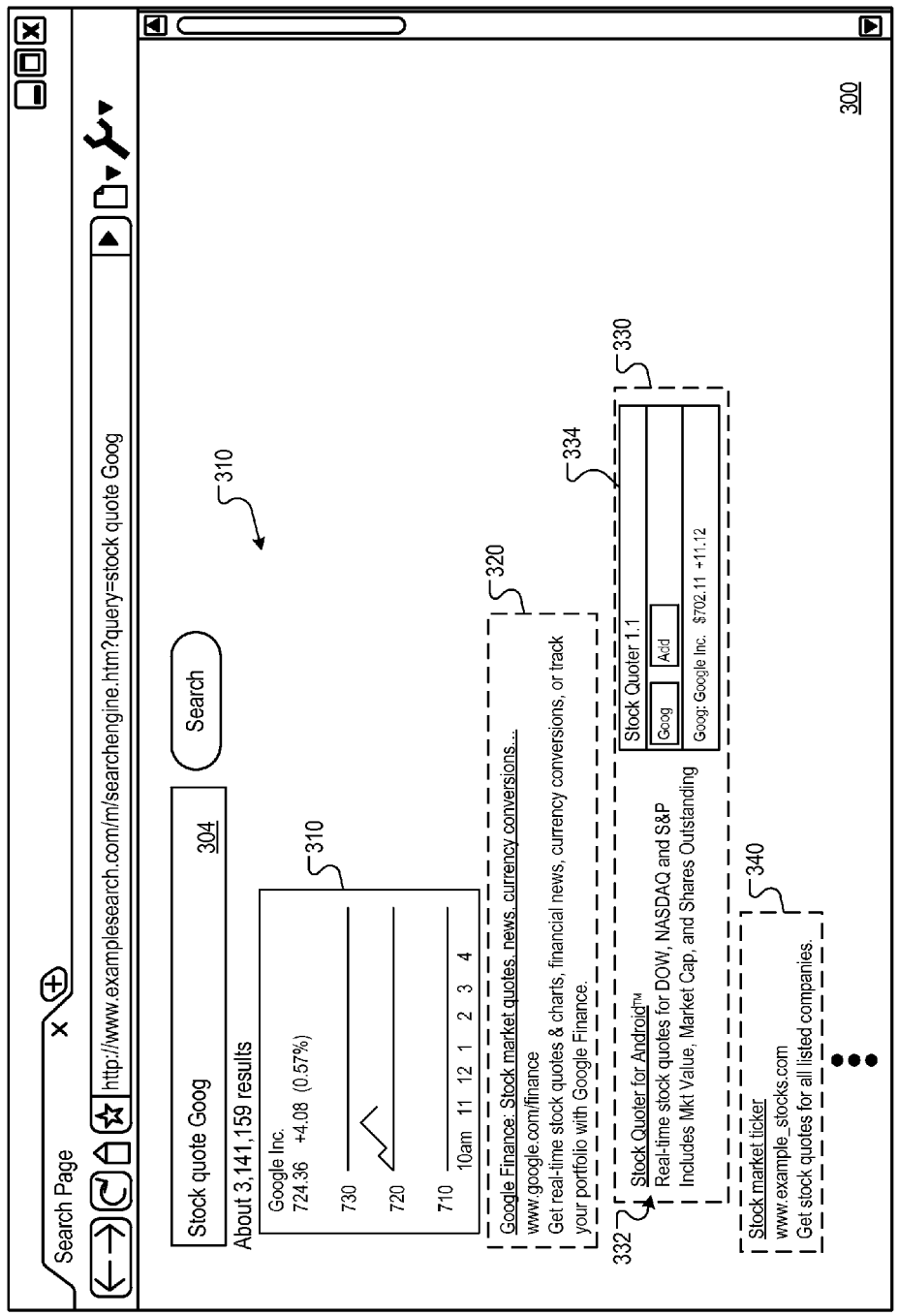
FIG. 3 is an illustration of a search results page that includes a native application search result.

After the application index 114 is built, the search engine 110 can access the application index 114 to identify native applications that may be responsive to a query. In some implementations, the applications may be identified by native application search results. For example, FIG. 3 is an illustration of a search results page 300 that includes a native application search result. Displayed in the search results page 300 are search results 310, 320, 330, and 340 that are responsive to the query "Stock quote Goog" displayed in the search input field 304. The search result 310 is a real time search result that is generated, for example, in part from a real time feed. The search results 320 and 340 are web search results generated in response to a search of a web index 112 of resources. Each search result 320 and 340 references a resource that can be rendered in a browser application on a user device and includes a link to the resource, and other data, such as a snippet of text extracted for the referenced resource.

The search result 330 is a native application search result that is generated in response to a search of the application index 114 of application pages. The search result 330 may include, for example, a snippet 332 of text and an image 334 of an application page. The snippet 334 may include, for example, the name of the native application (Stock Quoter for Andriod™) and text that has been extracted from one or more application pages of the native application. Additional text can also be included, such as text from metadata.

The image 334 may be, for example, an image of a rendered application page. In some implementations, multiple images for a particular application page may be stored, and the image that is most relevant to the query may be selected. For example, as show in FIG. 3 the image 334 includes an image for a stock quote for the Goog symbol, and the image is selected because the search query specifies the Goog symbol. The virtual machine 120 may, for example, be configured to collect a series of images for a particular application page if the application page can be rendered for different input parameters (e.g., stock tickers, movie titles, etc.). In some implementations, the images that are stored may be for the N most popular values that are provided from users, e.g., the top 100 most requested stocks, the top 100 most requested movies, etc.

In some implementations, selection of the image 334 at the user device causes the native application to launch and generate an instance of the application page that includes content that is relevant to the search query. For example, provided the native application Stock Quoter for Andriod™ is installed on the user device, selecting the image 334 causes the native application to launch and generate the application page that corresponds to the image 334. Furthermore, the application page is rendered to display the current stock quote for the Goog symbol. This can be accomplished, for example, by passing the input value of Goog in a command line for the native application. If, on the other hand, the native application is not installed, then selection of the image 334 may cause the user device 108 to display a web page resource at which the particular native application may be downloaded and installed on the user device 108.

Figure 4:
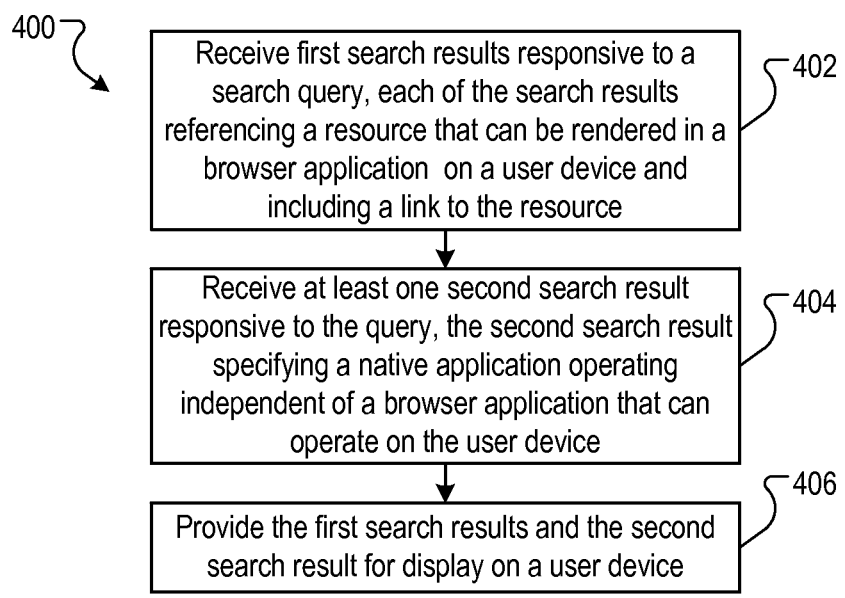
FIG. 4 is a flow diagram of an example process of providing search result for web page resources and application page resources.

FIG. 4 is a flow diagram of an example process 400 of providing search result for web page resources and application page resources. The process 400 can be implemented in a data processing apparatus of one or more computers in data communication.

The process 400 receives first search results responsive to a search query, each of the search results referencing a resource that can be rendered in a browser application on a user device and including a link to the resource (402). For example, as described above, a web server for a search engine may receive web search results 320 and 340 responsive to a query.

The process 400 receives at least one second search result responsive to the query, the second search result specifying a native application operating independent of a browser application that can operate on the user device (404). Again, as described above, a web server for a search engine may receive native application search result 330 responsive to the query.

The process 400 provides the first search results and the second search result for display on a user device (406). For example, the web server for the search engine may order the search results according to a ranking and provide the search result so that the search results are displayed according to the rank.

Figure 5:
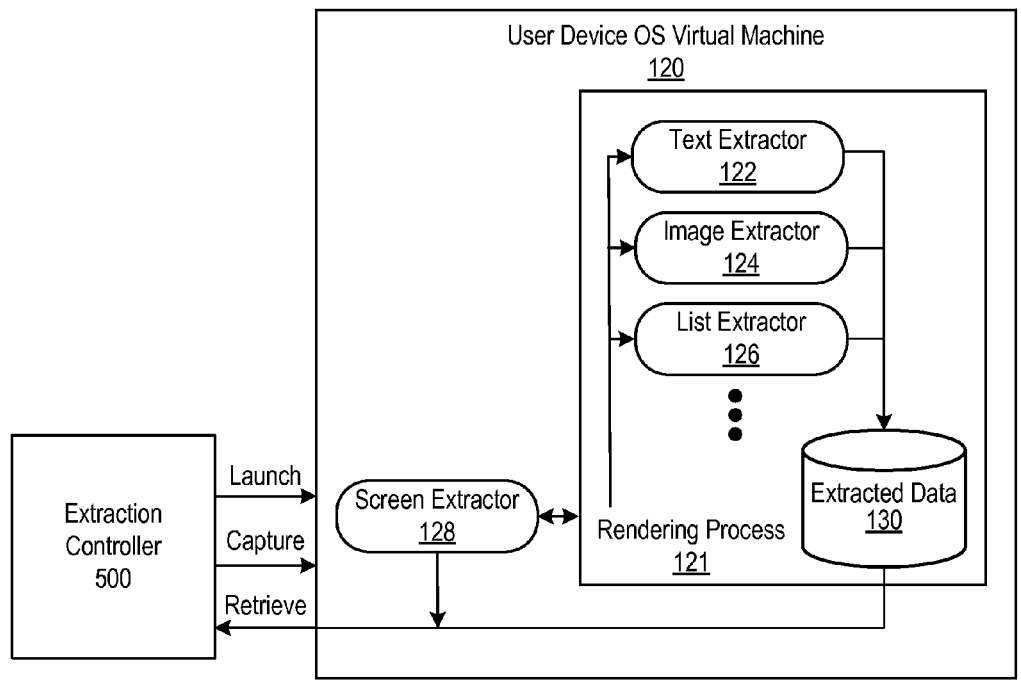
FIG. 5 is a system flow diagram of an extraction process.

FIG. 5 is a system flow diagram of an extraction process. An extraction controller 500 communicates instructions to the virtual machine 120 and receives application page data and screen data from the virtual machine 120. In operation, the extraction controller 500 instructs the virtual machine 120 to launch a particular native application 107, to access particular application pages within the native application 107 and to capture the application page data for each application page.

A rendering process 121 of the virtual machine 120 receives the application page data to render the content of the application page. The virtual machine 120 includes extractors, e.g., extractors 122, 124, 126, etc., that extract application page data describing content of the application page. In some implementations, the extractors are implemented as instructions that store the application page data provided to the rendering process 121 as extracted data 130.

For example, the extractors may include instructions that access particular objects of a view class, where each object occupies an area on a display of the application page when rendering is complete. The application page data are data for the particular objects of each view class. For example, for the Android™ operating system, the extractors 122, 124 and 126 may be implemented to access the TextView objects, ImageView objects, and ListView objects, respectively.

Additionally, a screen extractor 120 may extract an image of a rendered application page. The extracted image is, in some implementations, the image of the canvas on which the application page is rendered, and thus may be larger than an active viewport through which only a visible sub-portion of the application page may be viewed. The screen extractor 128 may, for example, be implemented by instructions that cause the rendering process 121 to output the rendered application page to the extraction controller, or, alternatively, store the rendered application page in the extracted data 130.

The extracted data are retrieved by the extraction controller 500 and provided, for example, to the indexer 140.

Figure 6A:
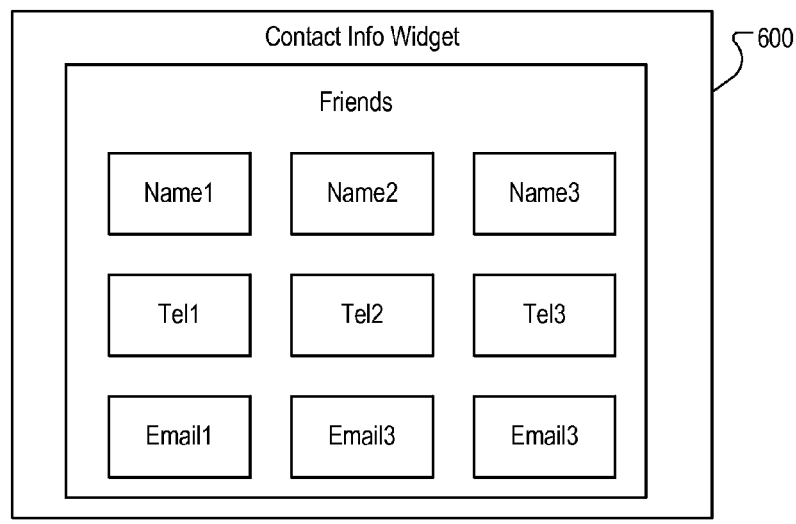
FIG. 6A is an illustration of an application page user interface.

FIG. 6A is an illustration of an application page user interface 600. The application page user interface 600 is for an example "Contact Info Widget" application in which a list of contact information for a "Friends" category of contacts is displayed. The contact information includes a name, a telephone number, and an e-mail address.

Figures 6B, 6C:
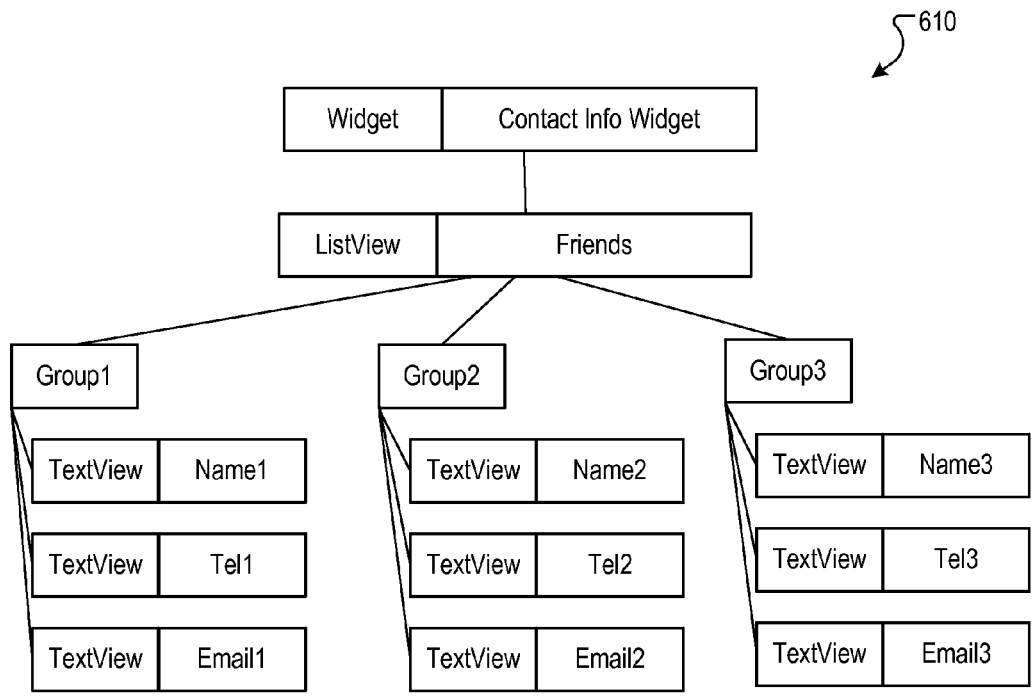
FIG. 6B is an illustration of classes and objects used in a rendering process to render the application page user interface.
FIG. 6C is an example of application page data describing content of the application page.

FIG. 6B is an illustration of classes and objects 610 used in a rendering process to render the application page user interface 600. The Contact Info Widget is an object that belongs to a widget class. For the particular application page user interface 600, a ListView object of "Friends" is accessed. The object "Friends" is associated with three groups, each of which contain a list of three TextView objects—a name object, a telephone object, and an e-mail object. The correspond text data for the respective name objects (Name1, Name2, Name3), telephone objects (Tel1, Tel2, Tel3), and e-mail objects (Email1, Email2, Email3) are listed in FIG. 6B and are displayed in FIG. 6A.

FIG. 6C is an example of application page data 620 describing content of the application page. The application page data 620 are hierarchically grouped according to the Widget class, ListView class, and TextView classes as shown. The application page data 620 for each corresponding class may be generated by an extractor for the particular class, such as a set of instructions that cause the data shown in FIG. 6C to be generated for the respective class.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus comprising one or more computers in data communication, the method comprising:
    instantiating a virtual machine emulating an operating system of a user device;
    instantiating, within the virtual machine, a native application that generates application pages for display on a user device within the native application, the native application operating independent of a browser application that can operate on the user device;
    accessing, within the virtual machine, application pages of the native application, and for each of the application pages:
        generating application page data describing content of the application page, the content described by the application page data including text that a user device displays on the application page when the user device displays the application page; and
        indexing the application page data for the native application in an index that is searchable by a search engine, the indexing comprising indexing the application page for the native application by a combination of a uniform resource identifier (URI) of the application page and a unique application identifier that identifies the native application.

2. The computer-implemented method of claim 1, further comprising:
    receiving, from a publisher of the native application, data specifying application pages to be indexed for the native application; and
    accessing application pages of the native application comprises accessing only the application pages that are specified to be indexed for the native application.

3. The computer-implemented method of claim 1, wherein generating application page data describing content of the application page comprises extracting text data provided to a rendering process of the native application, wherein the rendering process receives the text data and renders text based on the text data for display on a user device.

4. The computer-implemented method of claim 1, wherein the content described by the application page data further includes image data depicting an image of the application page.

5. The computer-implemented method of claim 4, wherein generating application page data describing content of the application page comprises:
    performing optical character recognition (OCR) on the image data to generate OCR text; and
    generating, based on the OCR text, text data describing the text that a user device displays on the application page.

6. The computer-implemented method of claim 1, wherein the content described by the application page data further includes application page link data describing at least one link within the application page that links to another application page.

7. The computer-implemented method of claim 1, wherein the content described by the application page data further includes web page link data describing at least one link within the application page that links to a resource referenced by a uniform resource locator that, when selected, instantiates a browser application that renders the resource in a browser environment separate from the native application.

8. A computer-implemented method performed by data processing apparatus comprising one or more computers in data communication, the method comprising:

receiving first search results responsive to a search query, each of the search results referencing a resource that can be rendered in a browser application on a user device and including a link to the resource, the first search results generated in response to a search of a first index of resources that can be rendered in the browser application;

receiving at least one second search result responsive to the query, the second search result specifying a native application operating independent of a browser application that can operate on the user device, the second search result generated in response to a search of a second index of application pages that can be display on a user device within the native application, wherein the second index includes a combination of a uniform resource identifiers (URI) of the application pages and a unique application identifier that identifies the native application; and providing the first search results and the second search result for display on a user device.

9. The computer-implemented method of claim 8, wherein the second search result includes an image of an application page that includes content responsive to the search query and selection data that causes, in response to a selection of the image at the user device, the native application to launch and generate an instance of the application page that includes content that is relevant to the search query.

10. The computer-implemented method of claim 8, wherein the second search result includes text of an application page, the text being responsive to the search query and describing content that is relevant to the search query.

11. A system, comprising:
a data processing apparatus; and
software stored in non-transitory computer readable storage medium storing instructions executable by the data processing apparatus and that upon such execution cause the data processing apparatus to perform operations comprising:
instantiating a virtual machine emulating an operating system of a user device;
instantiating, within the virtual machine, a native application that generates application pages for display on a user device within the native application, the native application operating independent of a browser application that can operate on the user device;
accessing, within the virtual machine, application pages of the native application, and for each of the application pages:
generating application page data describing content of the application page, the content described by the application page data including text that a user device displays on the application page when the user device displays the application page; and
indexing the application page data for the native application in an index that is searchable by a search engine, the indexing including indexing the application page for the native application by a combination of a uniform resource identifier (URI) of the application page and a unique application identifier that identifies the native application.

12. The system of claim 11, further comprising:
receiving, from a publisher of the native application, data specifying application pages to be indexed for the native application; and
accessing application pages of the native application comprises accessing only the application pages that are specified to be indexed for the native application.

13. The system of claim 11, wherein generating application page data describing content of the application page comprises extracting text data provided to a rendering process of the native application, wherein the rendering process receives the text data and renders text based on the text data for display on a user device.

14. The system of claim 11, wherein the content described by the application page data further includes image data depicting an image of the application page.

15. The system of claim 14, wherein generating application page data describing content of the application page comprises:
performing optical character recognition (OCR) on the image data to generate OCR text; and
generating, based on the OCR text, text data describing the text that a user device displays on the application page.

16. The system of claim 11, wherein the content described by the application page data further includes application page link data describing at least one link within the application page that links to another application page.

17. A computer-implemented method performed by data processing apparatus comprising one or more computers in data communication, the method comprising:
instantiating, within an operating system environment, a native application that generates application pages for display on a user device within the native application, the native application operating independent of a browser application that can operate on the user device;
accessing, within the operating system environment, application pages of the native application, and for each of the application pages:
extracting application page data describing content of the application page, the application page data being data provided to a rendering process of the native application, wherein the rendering process receives the application page data and renders the content of the application page based on the application page data;
associating the application page data with an application page identifier of the application page and a native application identifier of the native application; and
indexing the application page data, in part, by the application page identifier and the native application identifier.

18. The computer-implemented method of claim 17, wherein the application page data comprises data for a plurality of objects of a view class, wherein each object occupies an area on a display of the application page.

19. The computer-implemented method of claim 18, wherein the objects include a text view object that includes text data that is provided to a rendering process of the native application.

20. The computer-implemented method of claim 18, wherein the objects include a list view object that includes list data describing a list and that is provided to a rendering process of the native application.

21. The computer-implemented method of claim 17, further comprising:
extracting an image of the application page generated from the application page data by the rendering process; and
associating the image of the application page with the application page identifier of the application page and a native application identifier of the native application.

22. The computer-implemented method of claim 21, further comprising indexing the application page data and the image of the application page for the native application in an index that is searchable by a search engine.

23. A system, comprising:

a data processing apparatus; and software stored in non-transitory computer readable storage medium storing instructions executable by the data processing apparatus and that upon such execution cause the data processing apparatus to perform operations comprising:

instantiating, within an operating system environment, a native application that generates application pages for display on a user device within the native application, the native application operating independent of a browser application that can operate on the user device;

accessing, within the operating system environment, application pages of the native application, and for each of the application pages:

extracting application page data describing content of the application page, the application page data being data provided to a rendering process of the native application, wherein the rendering process receives the application page data and renders the content of the application page based on the application page data;

associating the application page data with an application page identifier of the application page and a native application identifier of the native application; and indexing the application page data, in part, by the application page identifier and the native application identifier.

24. The system of claim 23, wherein the application page data comprises data for a plurality of objects of a view class, wherein each object occupies an area on a display of the application page.

25. The system of claim 24, wherein the objects include a text view object that includes text data that is provided to a rendering process of the native application.

26. The system of claim 24, wherein the objects include a list view object that includes list data describing a list and that is provided to a rendering process of the native application.

27. The system of claim 23, the operations further comprising:

extracting an image of the application page generated from the application page data by the rendering process; and associating the image of the application page with the application page identifier of the application page and a native application identifier of the native application.

28. The system of claim 27, the operations further comprising indexing the application page data and the image of the application page for the native application in an index that is searchable by a search engine.

* * * * *